(12) United States Patent
Feijen et al.

(10) Patent No.: US 9,980,601 B2
(45) Date of Patent: May 29, 2018

(54) DEVICE FOR FROTHING A LIQUID

(71) Applicant: KONINKLIJKE PHILIPS N.V., Eindhoven (NL)

(72) Inventors: Fransiscus Hermannus Feijen, Eindhoven (NL); Joeke Noordhuis, Eindhoven (NL); Victor Hennink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 674 days.

(21) Appl. No.: 14/414,230

(22) PCT Filed: Jul. 9, 2013

(86) PCT No.: PCT/IB2013/055627
§ 371 (c)(1),
(2) Date: Jan. 12, 2015

(87) PCT Pub. No.: WO2014/009877
PCT Pub. Date: Jan. 16, 2014

(65) Prior Publication Data
US 2015/0182061 A1    Jul. 2, 2015

Related U.S. Application Data

(60) Provisional application No. 61/670,649, filed on Jul. 12, 2012.

(51) Int. Cl.
*A47J 31/44* (2006.01)
*A47J 43/12* (2006.01)
*B01F 3/04* (2006.01)

(52) U.S. Cl.
CPC ........ *A47J 31/4485* (2013.01); *A47J 43/121* (2013.01); *B01F 3/0446* (2013.01);
(Continued)

(58) Field of Classification Search
CPC ................ A47J 31/4485; A47J 31/4489; A47J 31/4492; A47J 31/4496;
(Continued)

(56) References Cited

U.S. PATENT DOCUMENTS 4,715,274 A     12/1987  Paoletti
5,473,972 A *   12/1995  Rizzuto ............... A47J 31/4403
                                                    99/290
(Continued)

FOREIGN PATENT DOCUMENTS

EP         2208452 A1    7/2010
JP      2003079514 A     3/2003
(Continued)

*Primary Examiner* — Sang Y Paik

(57) ABSTRACT

A device for frothing a liquid includes a tube-shaped housing with an inner surface having a curved periphery. At least one inlet is arranged in a lateral area of the housing for letting in the liquid and a frothing gas, and may have a tangential orientation with respect to the curved periphery of the inner surface of the housing. End faces of the housing are open and function as outlets of the device, where a longitudinal axis of the housing may extend in a horizontal direction. Rings may be provided inside the housing for keeping a rotating flow inside the housing during a period of time which is sufficiently long for a frothing process to take place in an effective manner.

12 Claims, 2 Drawing Sheets

(52) U.S. Cl.
CPC ... *B01F 3/04446* (2013.01); *B01F 2003/04872* (2013.01); *B01F 2215/0006* (2013.01)

(58) Field of Classification Search
CPC ....... A47J 43/121–43/127; B01F 2003/04872; B01F 2215/0006; B01F 3/04446; B01F 3/0446
USPC ........................................................... 99/290
See application file for complete search history.

(56) References Cited

U.S. PATENT DOCUMENTS

| | | | | |
|---|---|---|---|---|
| 5,699,719 A * | 12/1997 | Lucas | ................... | A47J 31/061 215/13.1 |
| 6,499,389 B1 * | 12/2002 | Probst | ................. | A47J 31/4485 261/DIG. 16 |
| 8,544,692 B2 * | 10/2013 | Rusch | .................. | B67D 1/0004 141/346 |
| 2005/0139082 A1 * | 6/2005 | Brouwer | ................ | A47J 31/30 99/279 |
| 2009/0087532 A1 | 4/2009 | Meier | | |
| 2013/0160657 A1 | 6/2013 | Mahlich | | |

FOREIGN PATENT DOCUMENTS

| | | | |
|---|---|---|---|
| JP | 2010273744 A | | 12/2010 |
| WO | 03105644 A1 | | 12/2003 |
| WO | 2012029019 A1 | | 3/2012 |

* cited by examiner

DEVICE FOR FROTHING A LIQUID

This application is the U.S. National Phase application under 35 U.S.C. § 371 of International Application No. PCT/IB2013/055627, filed on Jul. 9, 2013, which claims the benefit of U.S. Provisional Application No. 61/670,649 filed on Jul. 12, 2012. These applications are hereby incorporated by reference herein.

FIELD OF THE INVENTION

The invention relates to a device for frothing a liquid by means of interaction with a gas, comprising a tube-shaped housing, wherein an inner surface of the housing has a curved periphery, and wherein at least one inlet is arranged in a lateral area of the housing for letting in the liquid and the gas for frothing the liquid during operation of the device.

BACKGROUND OF THE INVENTION

In general, frothing a liquid involves supplying a gas like air to the liquid and mixing the liquid with the gas, for the purpose of obtaining a mass of bubbles in the liquid, which is referred to as foam. In many cases, the liquid to be frothed is milk. Especially in the field of making coffee and coffee specialties, there is a need for a device which is capable of frothing milk in a user-friendly manner. It is a well-known option to combine a frothing process of milk with a heating process of milk, wherein air is supplied to the milk for obtaining foam, and wherein steam is supplied to the milk for increasing the temperature of the milk.

U.S. Pat. No. 4,715,274 discloses a unit for emulsifying steam and milk to prepare cappuccinos, which is suitable to be used in a coffee making machine. The unit comprises a steam delivery conduit in communication with a steam generator. The steam delivery conduit opens into a suction chamber whereto a milk intake conduit and an air intake conduit are led. The suction chamber is in communication with an emulsifying chamber provided with an outward dispensing opening at the bottom. At the top, the emulsifying chamber is closed by a cover which is force fitted and provided with an annular seal.

The emulsifying chamber has a substantially cylindrical configuration, whereinto the steam is admitted in a near-emulsified state with the milk, to create a turbulent flow region which furthers the emulsification and condensation. The milk and steam mixture is admitted along a tangent direction so as to promote blending on the basis of a spinning movement inside the emulsifying chamber. From the cover of the emulsifying chamber, a partition extends in a downward direction for preventing spinning of the emulsion with too high a dispensing velocity and for promoting blending together of the steam, milk, and air particles. The dimensional ratios between the several conduits are selected to provide full condensation of the steam as it is admixed to milk and air, while ensuring adequate heating of the milk.

A disadvantage of the known device resides in the fact that the emulsifying unit is adapted to delivering only one stream of milk froth, namely through the opening which is present at the bottom of the substantially cylindrical emulsifying chamber. If it is desired for the device to deliver two streams of milk froth, so that it is possible to make two cups of cappuccino in one go, a Y-shaped piece or a T-shaped piece should be used for splitting the single stream of milk froth. Using an additional piece adds to the effort which needs to be taken in cleaning the device, and also results in a need for additional height in the total arrangement.

Another device for frothing a liquid is known from WO 2012/029019. In the device, a chamber which is arranged for allowing a frothing process to take place in an environment with excess frothing gas comprises a substantially round outlet tube provided at the bottom of the chamber. The outlet tube serves for letting out excess frothing gas besides liquid in a frothed state. The chamber is typically capable of delivering only one stream of frothed liquid, wherein it is not possible to use a Y-shaped piece or a T-shaped piece as mentioned in the foregoing for splitting the stream into two if so desired, due to the presence of the excess gas and the need to let out the excess gas from the chamber. The most straightforward way to realize outlet of frothed liquid at two positions seems to be applying a simple gutter-divider operated by gravity.

SUMMARY OF THE INVENTION

It is an object of the present invention to provide a device for frothing a liquid which is capable of delivering two streams of frothed liquid, wherein there is no need for using an additional component such as the Y-shaped piece, the T-shaped piece or the gutter-divider as mentioned in the foregoing, even in cases where a frothing process is performed in an environment with excess frothing gas. The object as mentioned is achieved by means of a device comprising a tube-shaped housing, wherein an inner surface of the housing has a curved periphery, wherein end faces of the housing are open for letting out two streams of frothed liquid, and wherein at least one inlet is arranged in a lateral area of the housing for letting in the liquid and the gas for frothing the liquid during operation of the device.

In the following, for sake of clarity, the simple and general term frother will be used for indicating a device for frothing a liquid.

According to the present invention, a frother can have a number of important aspects in common with the known frother. For example, the emulsifying chamber of the frother known from U.S. Pat. No. 4,715,274 can be defined like a tube-shaped housing having a curved inner surface and an inlet which is arranged in a lateral area of the housing. However, there is also a major difference, which is found in the fact that end faces of the housing of the frother according to the present invention are open, in an operative state of the frother, i.e. during a frothing process which is performed by applying the frother, whereas this is not the case with the known frothers. In particular, in the frother known from U.S. Pat. No. 4,715,274, one end face of the housing is open, as there is an opening in the bottom, whereas another end face of the housing is closed by a cover which is force fitted and provided with an annular seal. In the frother known from WO 2012/029019, one end face of the housing is open, as there is an outlet tube provided at the bottom, whereas another end face of the housing is simply closed.

In the frothers according to the state of the art, a frothing process involves a rotation of liquid to be frothed inside a housing in a more or less horizontal orientation, wherein the frothed liquid which is obtained eventually reaches an outlet which is provided at the bottom of the housing under the influence of gravity. According to an insight underlying the present invention, it is possible to have another orientation of the rotating liquid, and also to have two outlets in a housing, which do not necessarily need to be provided in a bottom of the housing. Furthermore, according to an insight underlying the present invention, the dimensions of a housing and the positioning of the outlets can be chosen such that an effective frothing process is realized on the one hand and two outlet streams of frothed liquid are realized in a practical way on the other hand, wherein it is possible to put two receptacles for receiving the frothed liquid in a position underneath the outlets of the housing in such a way that each of the receptacles is fed by another of the outlets. Moreover, it has been found that the two outlets of the housing can be very well combined with two outlets for dispensing another type of liquid to receptacles. For example, if the frothed liquid is frothed milk, a combination can be made with two outlets for dispensing coffee.

The end faces of the housing of the frother according to the present invention can be completely open or have at least one opening which is large enough for allowing the frothed liquid to pass through, flowing from the inside of the housing to the outside of the housing. When the present invention is applied in a context of a frothing process in which excess gas is used, the at least one opening in the end face can also be large enough for allowing the excess gas to escape from the housing without interfering with the frothed liquid or being hindered by the frothed liquid.

Advantageously, a longitudinal axis of the tube-shaped housing extends in a horizontal direction. In that way, it is possible to have a splitting arrangement which is substantially symmetric, depending on the positioning of the at least one inlet. For example, in case the frother comprises only one inlet, and the inlet is located at a position which is a central position as seen in a longitudinal direction of the housing, a frothing process takes place at the central position inside the housing, and the frothed liquid flows to the two open end faces of the housing in two similar streams, wherein a continuous process of frothed liquid which is continually pushed away from the central position by new quantities of liquid as they expand with gas bubbles takes place.

When the embodiment of the frother according to the present invention is compared with the known frothers, it is possible to define the frother according to the present invention as a frother which is tilted over 90 degrees such as to have a generally horizontal orientation instead of a generally vertical orientation, wherein the end face which used to be at the top side of the housing of the frother is opened in order to create a second outlet, wherein both the first outlet and the second outlet are arranged such as to allow for a stream of frothed liquid in a sideward direction, along the longitudinal axis of the housing. The construction is relatively simple as nothing more than a tube-shaped housing having two open end faces, with at least one inlet being arranged in a lateral area of the housing, is used. The splitting functionality of the frother according to the present invention does not require an addition of parts, so that cleanability of the frother can be as good as in a situation in which only a single outlet is present.

Preferably, in order to have an effective frothing process, the at least one inlet is connected to the housing in a tangential direction with respect to the curved periphery of the inner surface of the housing. In that case, when the liquid and the gas are supplied to the housing, a cyclone is obtained in the housing, which causes the liquid to interact with the gas, so that frothed liquid is formed. When the frothing process is carried out by using an excessive quantity of gas, the frothed liquid is separated from the excess gas under the influence of centrifugal forces, wherein the frothed liquid moves further away from a centre of the cyclone than the excess gas. For sake of completeness, it is noted that when the term "connected" is used in respect of the relation between the inlet and the housing, the term should be understood such as to cover both a direct connection and an indirect connection.

In a preferred embodiment of the frother according to the present invention, the housing is shaped like a hollow, right circular cylinder. Such a type of housing is robust and easy to manufacture. Moreover, such a type of housing is very well capable of providing space for an effective frothing process to take place, wherein each of the open end faces of the cylinder is used for delivering an outgoing quantity of frothed liquid and, in relevant cases, for allowing excess gas to escape.

In order to keep the rotating liquid inside the housing for a period of time which is sufficient for allowing the liquid to interact with the gas to such an extent that foam of a good quality is obtained, and in order to achieve a sufficient film thickness of the foam, it is advantageous to apply rings which are arranged inside the housing for locally decreasing the inner diameter of the housing, with an outer periphery being in contact with the inner surface of the housing. Advantageously, the rings are located at positions which are positions at opposite sides of the inlet, so that the rotating liquid and the frothed liquid cannot move towards the open end faces without any hindrance. If the rings would not be present, it could happen that quantities of the liquid are subjected to a frothing process during a period of time which is so short that the frothing process cannot be effective and only a very small film thickness is obtained, as a result of the liquid being allowed to flow directly towards the open end faces of the housing. By applying the rings, obstacles are created in the flow path, which keep the rotating liquid inside the housing, which slow down the transfer of the frothed liquid to the outside of the housing, and which are a determining factor in the film thickness.

It is advantageous for each of the rings to be a non-continuous ring, particularly a ring which is interrupted at one position. When the housing has a horizontal orientation as described in the foregoing, this one position is preferably a position at a bottom side of the housing. The fact is that on the basis of the presence of the interruption in the rings, any residue is allowed to escape from the housing when the frothing process has ended. This is especially desirable if the liquid is apt to getting bad over time, which is the case when the liquid is milk, for example.

Preferably, measures are taken in order to avoid turbulence at the position of the interruptions of the rings, so that disturbance of the rotation of the liquid and the frothed liquid can be avoided. In this respect, it is advantageous if, in each of the rings, at least one end which is present at the position where the ring is interrupted is chamfered. The orientation of the inlet for supplying the liquid to the housing determines the direction of rotation of the liquid inside the housing. If at least the end of the ring which is encountered by the liquid after having passed the interruption is chamfered, it is achieved that the liquid gradually gets in touch with the ring again. On the basis of this effect, it is possible to have a smooth and continuous frothing process, wherein a possible disturbing effect of the interruptions of the rings is minimized.

Another measure for guaranteeing smooth operation involves orienting the rings according to a turn of a helix, as doing so has a softening effect on sideward collision of the liquid with the rings. In this respect, it is noted that it is not essential if the helix is oriented inward or outward of the housing, as both options will have the softening effect as mentioned. In case a frothing process takes place with an excessive quantity of gas, the choice of the orientation of the helix influences a foam ratio, i.e. an extent to which the liquid is frothed, wherein an inward orientation causes a filling grade of the housing to be higher and thereby causes more gas to be mixed into the liquid.

In a preferred embodiment, the frother according to the present invention comprises a single inlet and two rings, wherein the inlet is located at a position which is a central position as seen in a longitudinal direction of the housing, and wherein the rings are located at positions which are positions at opposite sides of the inlet, at practically the same distance with respect to the inlet. In this symmetric arrangement, the streams of frothed liquid emitted by the frother through the open end faces of the housing can be expected to be more or less equal. Once again, it is emphasized that according to the present invention, two streams of frothed liquid can simply be obtained by relying on natural phenomena, wherein there is no need for applying additional components for dividing a single stream into two. Within the framework of the present invention, it is possible for a frother to be equipped with two inlets in parallel, so that it really can be guaranteed that exactly the same quantities are produced at the two sides of the housing, but then a more complex construction would be obtained for realizing no more than a small improvement which is not required in practice.

It is possible for the frother according to the present invention to be equipped with flaps which are arranged at the open end faces of the housing. An advantage of having such flaps or similar means is that they are suitable to be used for guiding frothed liquid away from the frother during operation of the frother, so that a supply of frothed liquid from the frother is not just a matter of the frothed liquid falling down from the sides of the housing in a somewhat uncontrolled manner.

Like the known frothers, the frother according to the present invention is suitable to be used in a device for making coffee, for example. In such a case, the outlets of the frother as constituted by the open end faces of the housing can be positioned close to coffee outlets of the larger device. In general, the frother according to the present invention can be part of a larger device for making a beverage, wherein the inlet is connected to a reservoir for containing a liquid, through a suction chamber of the larger device which is arranged for receiving the liquid and which is open to a gas to be used for frothing the liquid. Furthermore, the inlet can be connected to a steam generator of the larger device, through the suction chamber.

It follows from the foregoing that the present invention also relates to a device for making a beverage, comprising a frother according to the present invention, and a system for supplying liquid to be frothed and a frothing gas to the frother, wherein the frother is connected to the system through the at least one inlet. It is possible for the device for making a beverage to further comprise a steam generator, wherein the frother is connected to the steam generator through the at least one inlet. In particular, the present invention also relates to a coffee maker which comprises a unit for making coffee and a unit for making frothed milk, wherein the latter unit comprises a frother according to the present invention, and a system for supplying milk to be frothed and air to the frother, and wherein the frother is connected to the system through the at least one inlet.

The above-described and other aspects of the present invention will be apparent from and elucidated with reference to the following detailed description of a practical embodiment of a frother comprising a tube-shaped housing having open end faces.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF EMBODIMENTS

Figure 1:
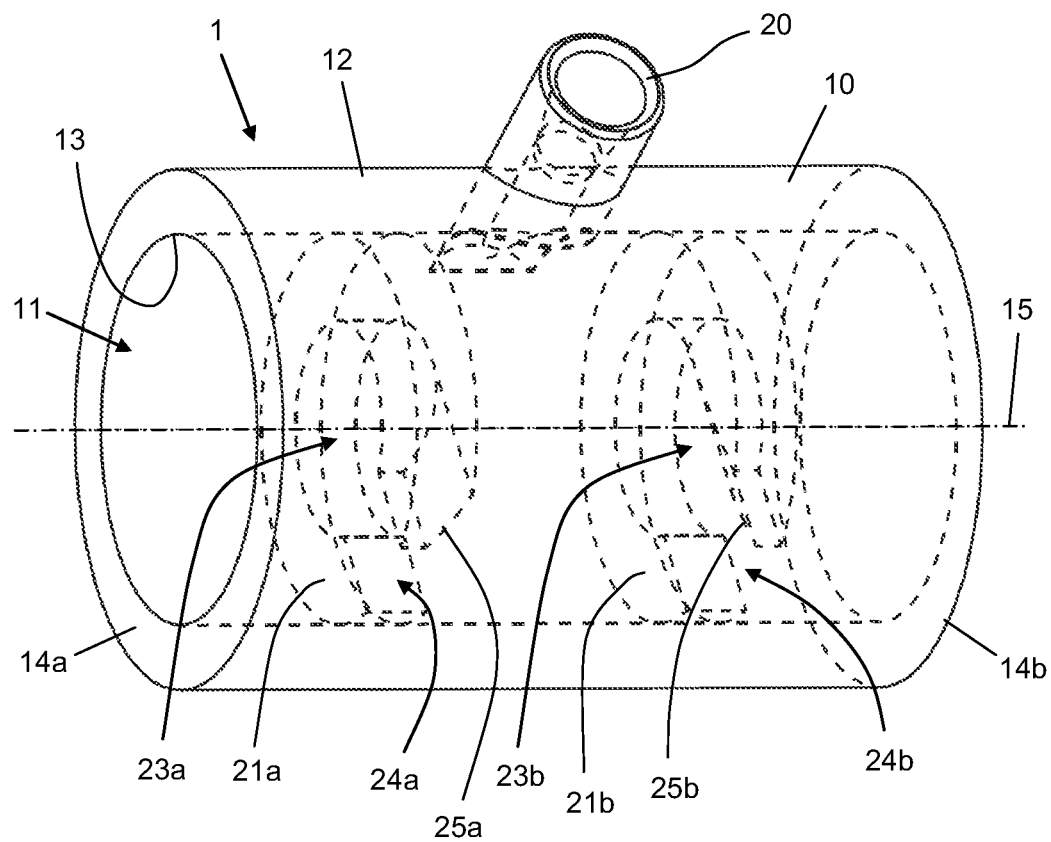
FIG. 1 shows a perspective view of a frother according to the present invention, wherein internal components of the frother are depicted by means of dashed lines.

FIG. 1 shows a perspective view of a frother 1 according to the present invention. A basic function of the frother 1 is frothing a liquid, i.e. mixing a liquid with a gas, for the purpose of obtaining a mass of bubbles in the liquid, which is referred to as foam. To that end, the liquid is moved inside the frother 1 while being exposed to the gas. It is also possible that the liquid is heated in the process. In the following, it is assumed that the liquid to be frothed is milk, that the gas is air, and that steam is supplied to the frother 1 in order to heat the milk. Hence, when the frother 1 is operated, milk, air and steam are supplied to the frother 1, and hot frothed milk emitted by the frother 1.

Figure 2:
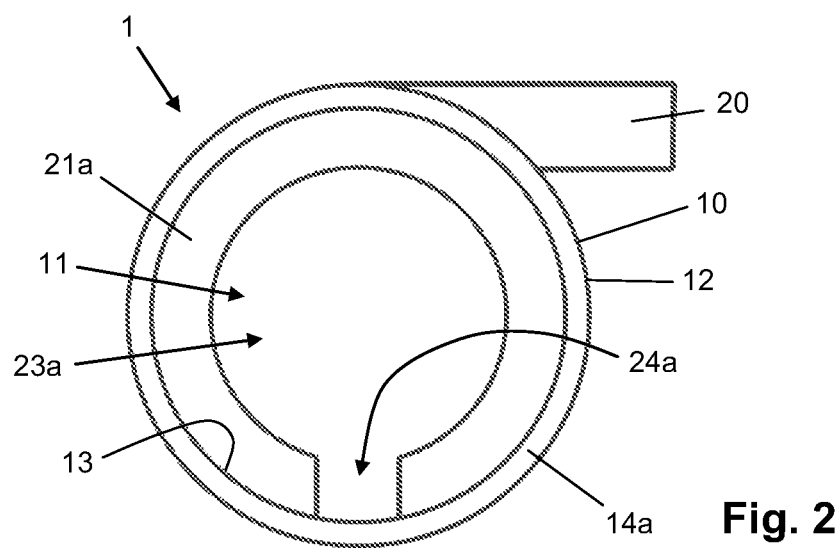
FIG. 2 shows a side view of the frother.

The frother 1 is especially intended to be part of a larger device which is adapted to use a frothed liquid in a process of making a beverage, such as a coffee maker. In FIG. 1, the frother 1 is shown in a normal, operative orientation, i.e. an orientation in which the frother 1 should be positioned inside a larger device. FIG. 2 shows a side view of the frother 1 in the normal, operative orientation.

In general, the frother 1 comprises a tube-shaped housing 10 having an interior space 11, and an inlet 20 which is arranged in a lateral area 12 of the housing 10. In the shown example, the housing 10 is shaped like a hollow, right circular cylinder. Hence, an inner surface 13 of the housing 10 has a curved periphery, particularly a circular periphery. End faces 14a, 14b of the housing 10 are open. In FIG. 1, a longitudinal axis of the housing 10 is indicated by means of a dot-and-dash line 15. The housing 10 is oriented such that the longitudinal axis 15 extends in a horizontal direction.

The inlet 20 serves for supplying milk, air and steam to the interior space 11 of the housing 10. It is noted that within the framework of the present invention, it is possible to have more than one inlet 20 in the frother 1. However, having only one inlet 20 is a practical option, wherein the frother 1 may be used in combination with a chamber (not shown) for joining flows of milk, air and steam first, in a way as known from U.S. Pat. No. 4,715,274, for example. In any case, the inlet 20 provides access to the interior space 11 of the housing 10 from outside of the housing 10. It is preferred for the inlet 20 to be connected to the housing 10 in a tangential orientation with respect to the circular periphery of the inner surface 13 of the housing 10, so that when a flow of milk, air and steam exits the inlet 20, it automatically starts to follow a circular path along the inner surface 13, wherein a smooth transition of the inlet 20 to the inner surface 13 is guaranteed, and a loss of kinetic energy of the flow is minimized.

The frothing process takes place as the mixture of milk, air and steam rotates inside the frother 1. In order to avoid a situation in which the mixture is discharged directly through the open end faces 14a, 14b of the housing 10, two rings 21a, 21b are arranged inside the housing 10, following the circular periphery of the inner surface 13 of the housing 10 at positions on either side of the inlet 20. In the shown example, the rings 21a, 21b have a concentric arrangement with respect to the housing 10, wherein an outer periphery of the rings 21a, 21b is in contact with the inner surface 13 of the housing 10. In this respect, it is noted that the rings 21a, 21b may be provided as separate parts which are attached to the housing 10 during an assembling process of the frother 1. However, it is also possible that the rings 21a, 21b are integral parts of the housing 10.

At the position of the rings 21a, 21b, an inner diameter of the housing 10 is locally decreased. A mixture of milk, air and steam which is rotating inside the housing 10 at a position between the rings 21a, 21b and gradually moving towards the end faces 14a, 14b of the housing 10 encounters the rings 21a, 21b. As a result, the mixture and the frothed milk which is obtained are kept inside the housing 10 for a longer period of time, so that a better result of the frothing process can be achieved.

Figure 3:
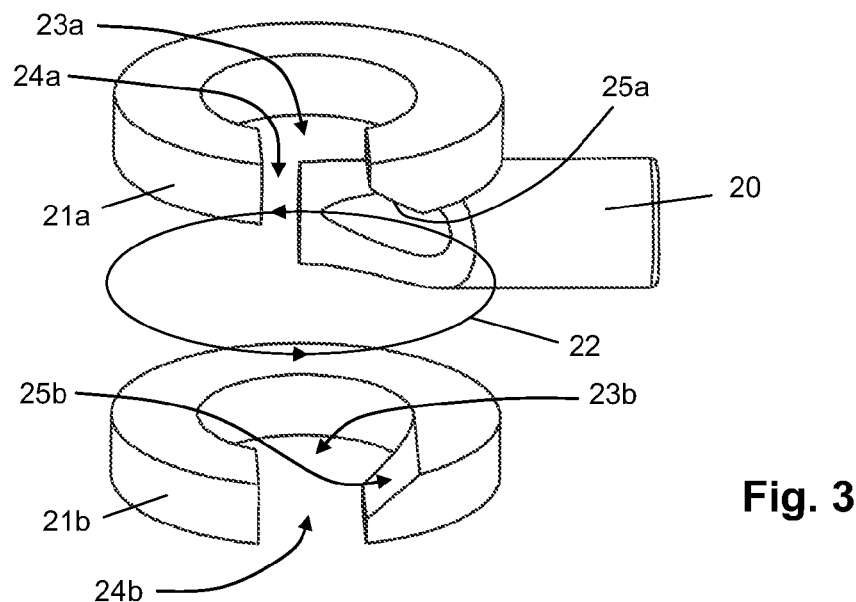
FIG. 3 illustrates the way in which a mixture containing a liquid and a gas, and frothed liquid rotate inside the frother during operation.

FIG. 3 serves to illustrate the way in which the mixture and the frothed milk rotate inside the frother 1 during operation, at a position between the rings 21a, 21b. The rotation movement is diagrammatically depicted like a circular arrow 22. In the process of the movement of the mixture, frothed milk builds up. Frothed milk reaching an open space 23a, 23b of the rings 21a, 21b is free to move towards the open end faces 14a, 14b of the housing 10 and exit the housing 10. Also, if frothing takes place by using an excessive amount of air, the air can easily escape through the open end faces 14a, 14b as mentioned. Hence, when the frother 1 is operated, frothed milk is emitted through the open end faces 14a, 14b of the housing 10, and if excess air is present, the air escapes through the open end faces 14a, 14b as well. The two streams of frothed milk are more or less the same as a result of the fact that the inlet 20 has a central position with respect to the housing 10 as seen in a longitudinal direction of the housing 10, and the rings 21a, 21b have a symmetric arrangement with respect to the inlet 20. In fact, in the shown example, the frother 1 is mirror symmetric with respect to a plane of symmetry which is perpendicular to the longitudinal axis 15 of the housing 10 and which divides the inlet 20 in two halves. The distribution of the frothed milk inside the housing 10 takes place in a random manner and therefore, more or less equal quantities flow through the open end faces 14a, 14b of the housing 10 in the symmetric arrangement as described in the foregoing.

In order to avoid a situation in which milk residue stays behind in the housing 10 after a frothing process has ended, the rings 21a, 21b have an interruption 24a, 24b at a bottom side. Once the input of the mixture of milk, air and steam through the inlet 20 stops, the rotation movement stops, and any milk residue which is still present between the rings 21a, 21b accumulates at the lowest level in the housing 10 under the influence of gravity. Free passage of this milk residue to the open end faces 14a, 14b of the housing 10 is possible through the interruptions 24a, 24b of the rings 21a, 21b.

At the position of the interruptions 24a, 24b, ends of the rings 21a, 21b are provided with chamfers 25a, 25b for ensuring that during a frothing process, the rotating mixture of milk, air and steam, and the rotating frothed milk are kept between the rings 21a, 21b. The chamfers 25a, 25b serve as a ramp to the rings 21a, 21b in the direction in which the rotation takes place, which is related to the orientation of the inlet 20, and play a role in avoiding turbulence at the position of the interruptions 24a, 24b.

Figure 4A:
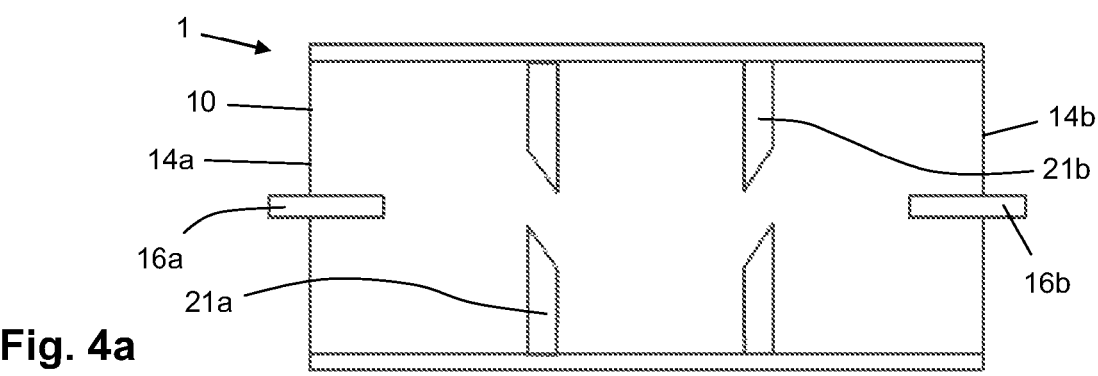
FIG. 4a shows a view of a longitudinal section of a practical variant of the frother, taken along a horizontal plane.
Figure 4B:
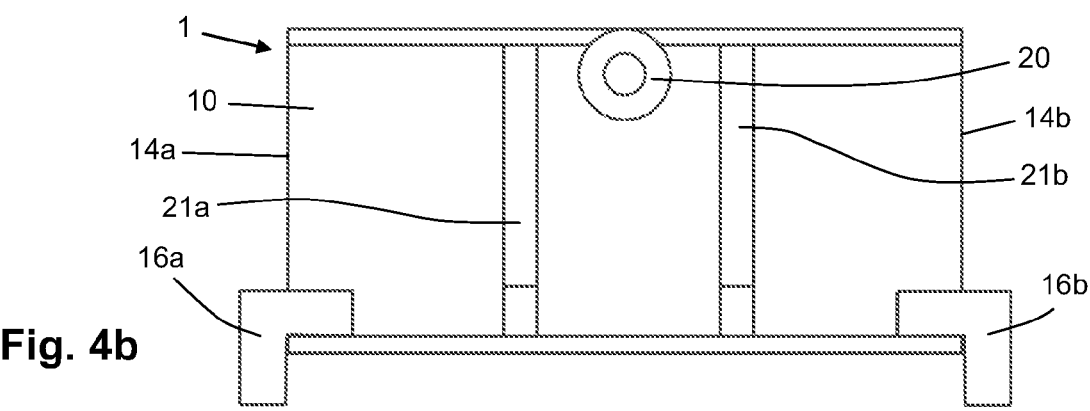
FIG. 4b shows a view of a longitudinal section of the practical variant of the frother as mentioned, taken along a vertical plane.

It may be desirable to have means for guiding the frothed milk which is emitted by the frother 1 away from the frother 1 in a controlled manner. To this end, it is possible to have a flap 16a, 16b at each of the open end faces 14a, 14b of the housing 10 as shown in FIGS. 4a and 4b. In practical cases, controlling the way in which the frothed milk is discharged from the frother 1 is important, because the end faces 14a, 14b of the housing 10 should not be positioned too far apart in order to have a possibility of using only one receptacle for receiving frothed milk from the frother 1. The flaps 16a, 16b provide a means for allowing the flow of frothed milk to slow down and settle. An example of a maximum dimension of the housing 10 between the end faces 14a, 14b is 40 mm. If the dimension of the housing 10 as mentioned is only 10 mm, to mention a possibility, there is only a space of 15 mm at both sides of the housing 10 which can be used for bringing the frothed milk to a more steady state.

It follows from the foregoing that the frother 1 according to the present invention has a relatively simple construction and is capable of delivering two streams of hot frothed milk in a reliable manner. An output flow rate of the hot frothed milk is low when compared to an inlet flow rate of the mixture of the milk, the air and the steam, due to condensation of the steam which takes place during the process of combined heating and frothing. This is another advantageous aspect when it comes to the practical application of the frother 1.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such illustration and description are to be considered illustrative or exemplary only, and not restrictive. The present invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the horizontal orientation of the frother 1 as described in the foregoing, it is very practical if the inlet 20 is arranged at a top side of the housing 10, as can be seen in some of the figures. However, that does not alter the fact that another position of the inlet 20 is possible, including a position at a bottom side of the housing 10.

For sake of completeness, in conformity with what is mentioned in the foregoing, it is noted that a symmetric appearance of the frother 1 is preferred, but not essential within the framework of the present invention. Also, the application of the rings 21a, 21b is not essential. In case rings 21a, 21b are used, the number of rings 21a, 21b can be chosen freely, and the positioning of the rings 21a, 21b is also not dictated in any way.

The frother 1 according to the present invention is very well suitable to be used for the purpose of heating and frothing milk, wherein it is possible to expose the milk to an excessive amount of air if so desired. That does not alter the fact that other applications of the frother 1 are feasible as well. In general, the present invention provides a practical way of having two outlets 14a, 14b in a frother 1 without a need for a complex construction.

The invention can be summarized as follows. A device 1 for frothing a liquid by means of interaction with a gas comprises a tube-shaped housing 10. An inner surface 13 of the housing 10 has a curved periphery. At least one inlet 20 is arranged in a lateral area 12 of the housing 10 for letting in the liquid and the gas for frothing the liquid during operation of the device 1. End faces 14a, 14b of the housing 10 are open and function as outlets of the device 1, wherein it is preferred for a longitudinal axis 15 of the housing 10 to extend in a horizontal direction. The inlet 20 may be connected to the housing 10 in a tangential direction with respect to the curved periphery of the inner surface 13 of the housing 10, so that a rotation movement of an incoming flow can be realized. Rings 21a, 21b may be applied inside the housing 10 for keeping the rotating flow inside the housing 10 during a period of time which is sufficiently long for a frothing process to take place in an effective manner and for obtaining a sufficient film thickness of foam to be produced as a result of a frothing process.

The invention claimed is:

1. A device for frothing a liquid by interaction with a gas, comprising a tube-shaped housing, wherein an inner surface of the housing has a curved periphery, wherein end faces of the housing are open for letting out two streams of frothed liquid, wherein at least one inlet is arranged in a lateral area of the housing for letting in the liquid and the gas for rotation the housing and frothing the liquid during operation of the device, wherein a ring arranged inside the housing for locally decreasing an inner diameter of the housing, an outer periphery of the ring being in contact with the inner surface of the housing, wherein the ring is a non-continuous ring including an interruption at one position, and wherein at least one end of the ring present at a position of the interruption is chamfered as a ramp to the ring in a direction of the rotation.

2. The device according to claim 1, wherein a longitudinal axis of the housing extends in a horizontal direction.

3. The device according to claim 1, wherein the at least one inlet is connected to the housing in a tangential orientation with respect to the curved periphery of the inner surface of the housing.

4. The device according to claim 1, wherein the housing has a shape of a hollow, right circular cylinder.

5. The device according to claim 1, wherein flaps are arranged at the open end faces of the housing for guiding frothed liquid away from the device during operation of the device.

6. The device according to claim 1, being part of a beverage device for making a beverage, wherein the inlet is connected to a reservoir for containing a liquid, through a suction chamber of the beverage device which is arranged for receiving the liquid and which is open to a gas to be used for frothing the liquid.

7. The device according to claim 6, wherein the inlet is connected to a steam generator of the beverage device, through the suction chamber.

8. A beverage device for making a beverage, comprising a device for frothing according to claim 1, and a system for supplying liquid to be frothed and a frothing gas to the device, wherein the device for frothing is connected to the system through the at least one inlet.

9. The beverage device according to claim 8, further comprising a steam generator, wherein the device is connected to the steam generator through the at least one inlet.

10. A coffee maker, comprising a unit for making coffee and a unit for making frothed milk, wherein the unit for making frothed milk comprises a device according to claim 1, and a system for supplying milk to be frothed and air to the device, and wherein the device is connected to the system through the at least one inlet.

11. The device according to claim 1, wherein the ring is oriented according to a turn of a helix.

12. The device according to claim 1, comprising a single inlet and two rings, wherein the inlet is located at a position which is a central position as seen in a longitudinal direction of the housing, and wherein the two rings are located at positions which are positions at opposite sides of the inlet, at a same distance with respect to the single inlet.

* * * * *